US008973000B2

(12) United States Patent
Kuno et al.

(10) Patent No.: US 8,973,000 B2
(45) Date of Patent: Mar. 3, 2015

(54) DETERMINING MULTIPROGRAMMING LEVELS

(75) Inventors: Harumi Kuno, Cupertino, CA (US); Janet L. Wiener, Palo Alto, CA (US); Lyle H. Ramshaw, Palo Alto, CA (US); Umeshwar Dayal, Saratoga, CA (US); William K. Wilkinson, Sunnyvale, CA (US); Stefan Krompass, Dietersheim (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 676 days.

(21) Appl. No.: 12/777,401

(22) Filed: May 11, 2010

(65) Prior Publication Data
US 2011/0283283 A1 Nov. 17, 2011

(51) Int. Cl.
G06F 9/46 (2006.01)
G06F 9/50 (2006.01)

(52) U.S. Cl.
CPC .................... *G06F 9/5083* (2013.01)
USPC .......................................................... 718/101

(58) Field of Classification Search
CPC ...................................................... G06F 9/505
USPC ................................................ 718/105, 101
See application file for complete search history.

(56) References Cited

U.S. PATENT DOCUMENTS

| 5,437,032 | A | 7/1995 | Wolf et al. |
| 5,765,146 | A | 6/1998 | Wolf et al. |
| 5,806,059 | A | 9/1998 | Tsuchida et al. |
| 6,223,326 | B1* | 4/2001 | Fields et al. ................. 716/103 |
| 6,874,145 | B1* | 3/2005 | Ye et al. ....................... 718/108 |
| 7,756,940 | B2* | 7/2010 | Sagawa ........................ 709/207 |
| 8,045,473 | B2* | 10/2011 | Hammer ....................... 370/236 |
| 2003/0195918 | A1* | 10/2003 | Horn et al. .................. 709/102 |
| 2004/0133680 | A1* | 7/2004 | Sorrentino et al. ......... 709/226 |
| 2005/0207439 | A1 | 9/2005 | Iyengar et al. |
| 2006/0026179 | A1 | 2/2006 | Brown et al. |
| 2006/0190430 | A1 | 8/2006 | Luo et al. |
| 2008/0172676 | A1* | 7/2008 | Bose et al. .................. 719/314 |
| 2011/0283294 | A1 | 11/2011 | Wiener |

OTHER PUBLICATIONS

Daniel Gmach et al., "Adaptive Quality of Service Management for Enterprise Services", ACM Transactions on the Web, vol. 2, No. 1, Article 8, Feb. 2008, 46 pages.
Stefan Krompass et al., A Testbed for Managing Dynamic Mixed Workloads, VLDB 2009, Aug. 24-28, 2009, Lyon, France, 4 pages.
Abhay Mehta et al., "BI Batch Manager: A System for Managing Batch Workloads on Enterprise Data-Warehouses", EDBT 2008, Mar. 25-30, 2008, Nantes, France, pp. 640-651.

(Continued)

*Primary Examiner* — Camquy Truong
(74) *Attorney, Agent, or Firm* — Hewlett-Packard Patent Department

(57) ABSTRACT

A method of managing the execution of a workload of transactions of different transaction types on a computer system. Each transaction type may have a different resource requirement. The method may include intermittently, during execution of the workload, determining the performance of each transaction type. A determination may be made of whether if there is an overloaded transaction type in which performance is degraded with an increase in the number of transactions of the transaction type. If there is an overloaded transaction type, the number of transactions of at least one transaction type may be changed.

16 Claims, 6 Drawing Sheets

(56) References Cited

OTHER PUBLICATIONS

Baoning Niu et al., "Adapting Mixed Workloads to Meet SLOs in Autonomic DBMSs", ICDE 2007, Apr. 17-20, 2007, Istanbul, Turkey, 7 pages.

Bianca Schroeder et al., "How to Determine a Good Multi-Programming Level for External Scheduling", ICDE 2006, Apr. 3-7, 2006, 12 pages.

Gerhard Weikum et al., "Self-Tuning Database Technology and Information Services: From Wishful Thinking to Viable Engineering", VLDB 2002, Hong Kong, China, 12 pages.

* cited by examiner

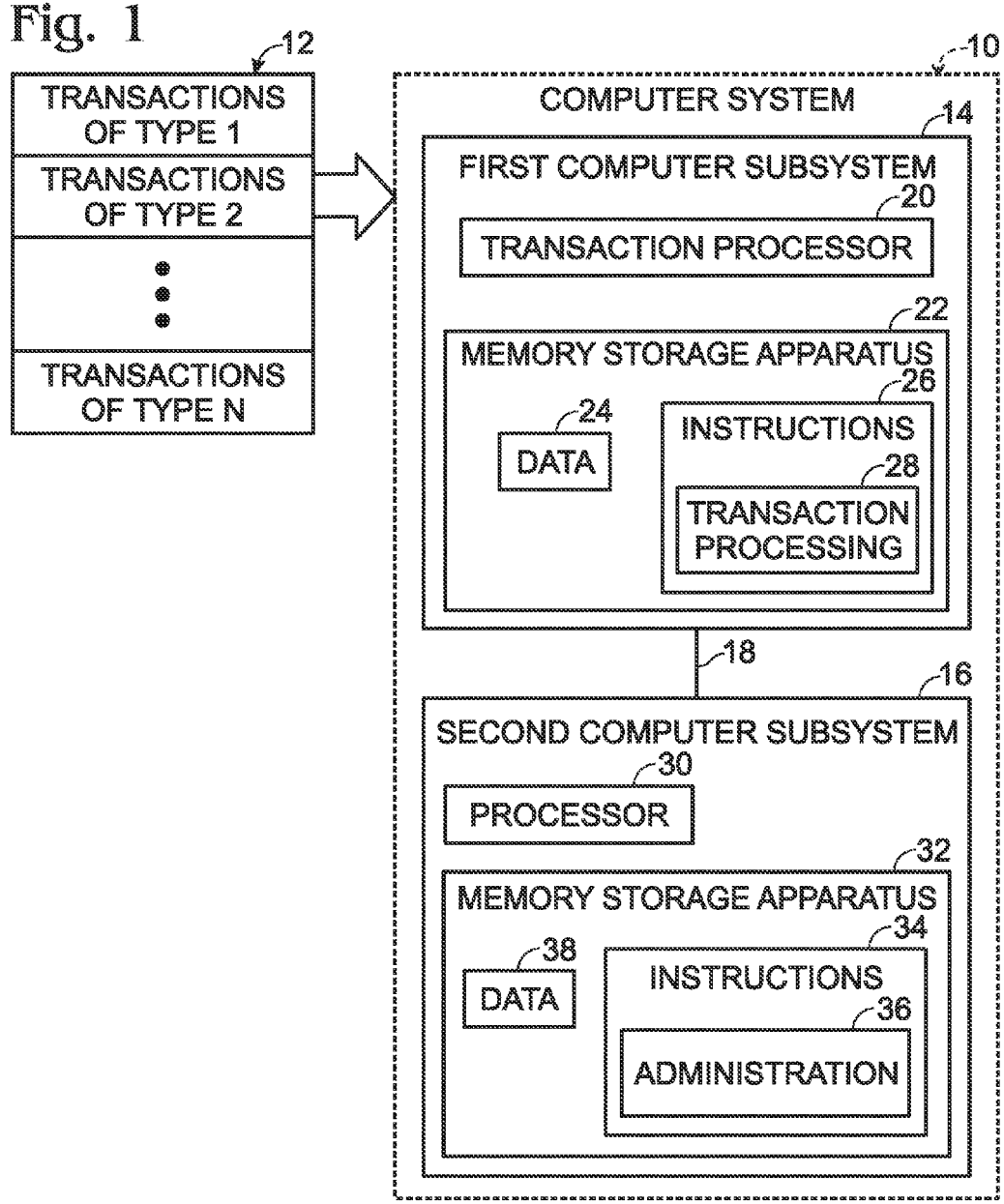

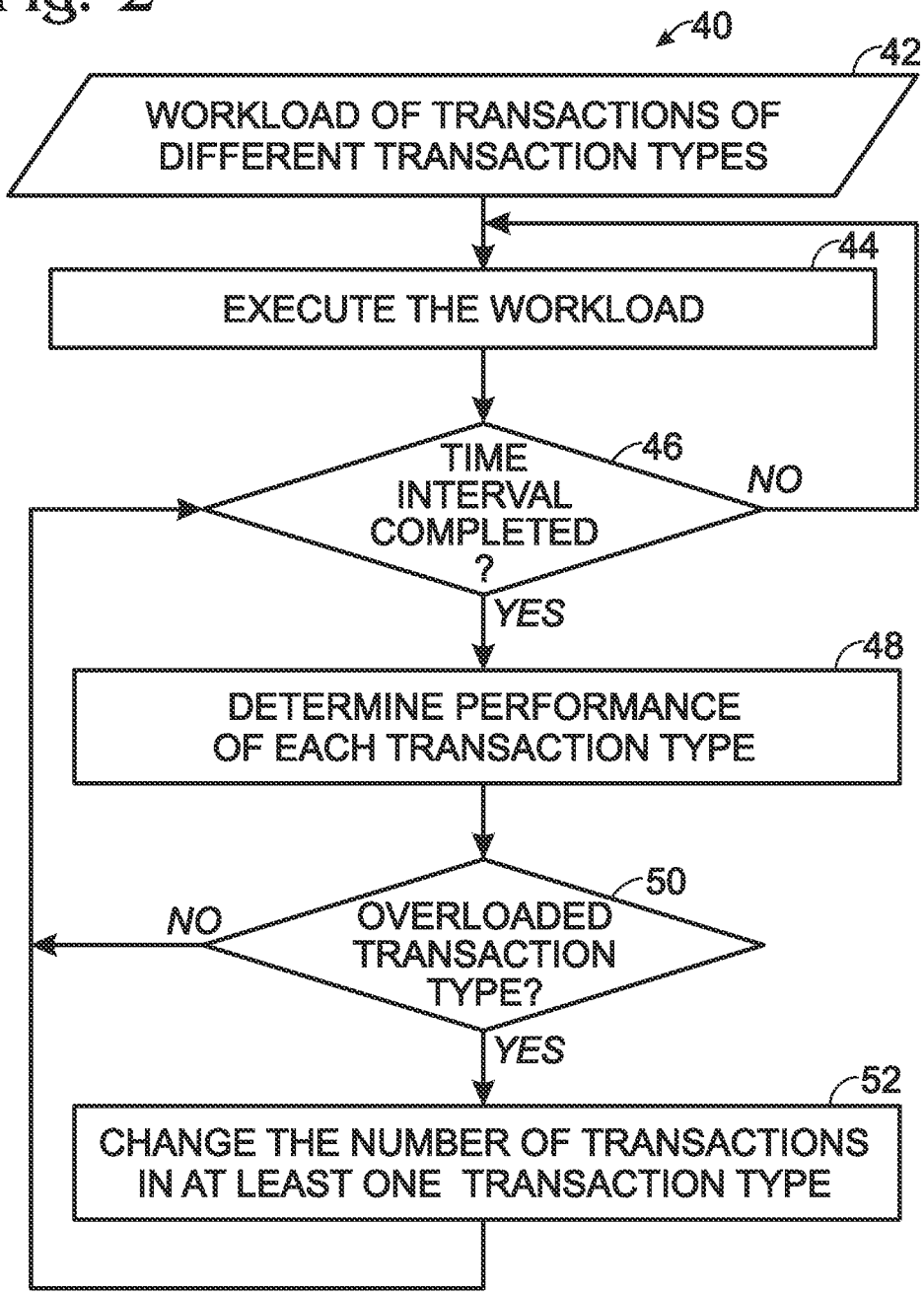

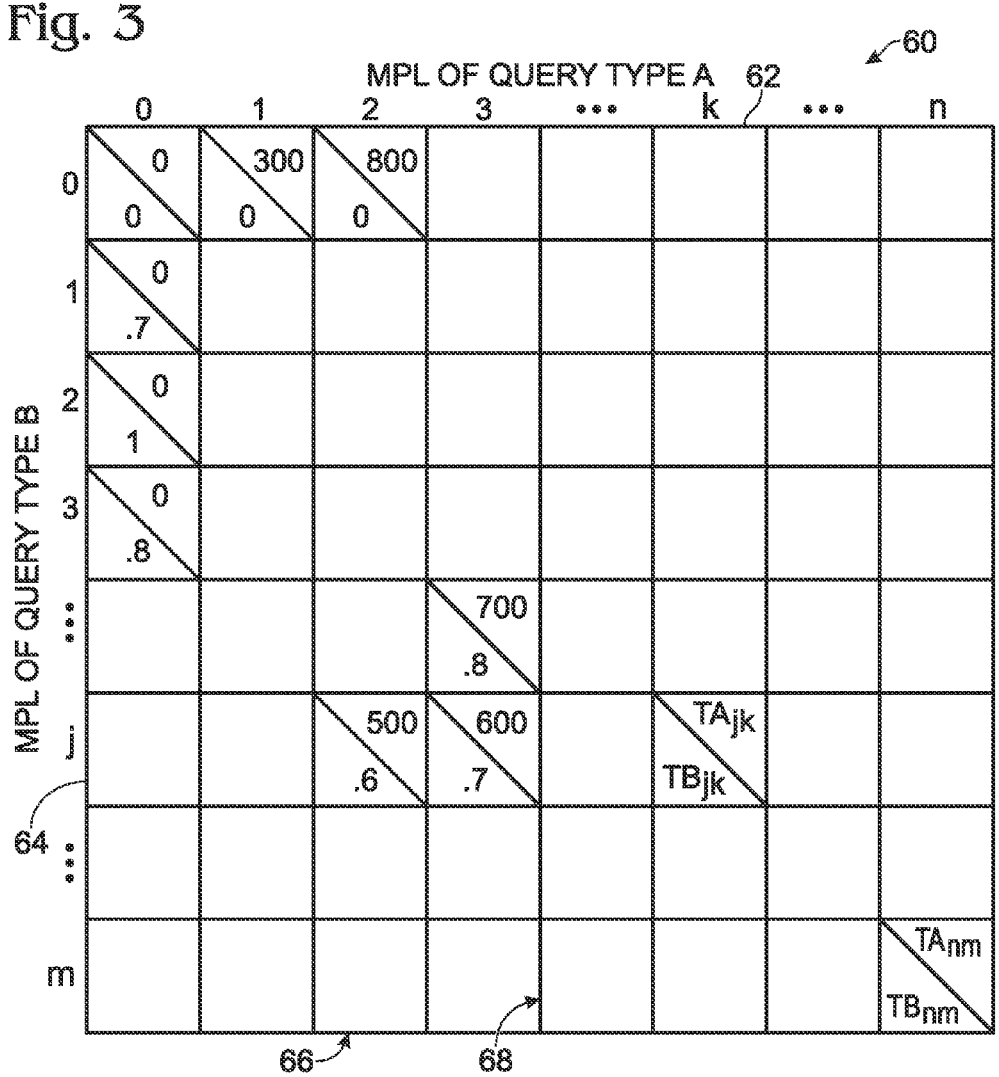

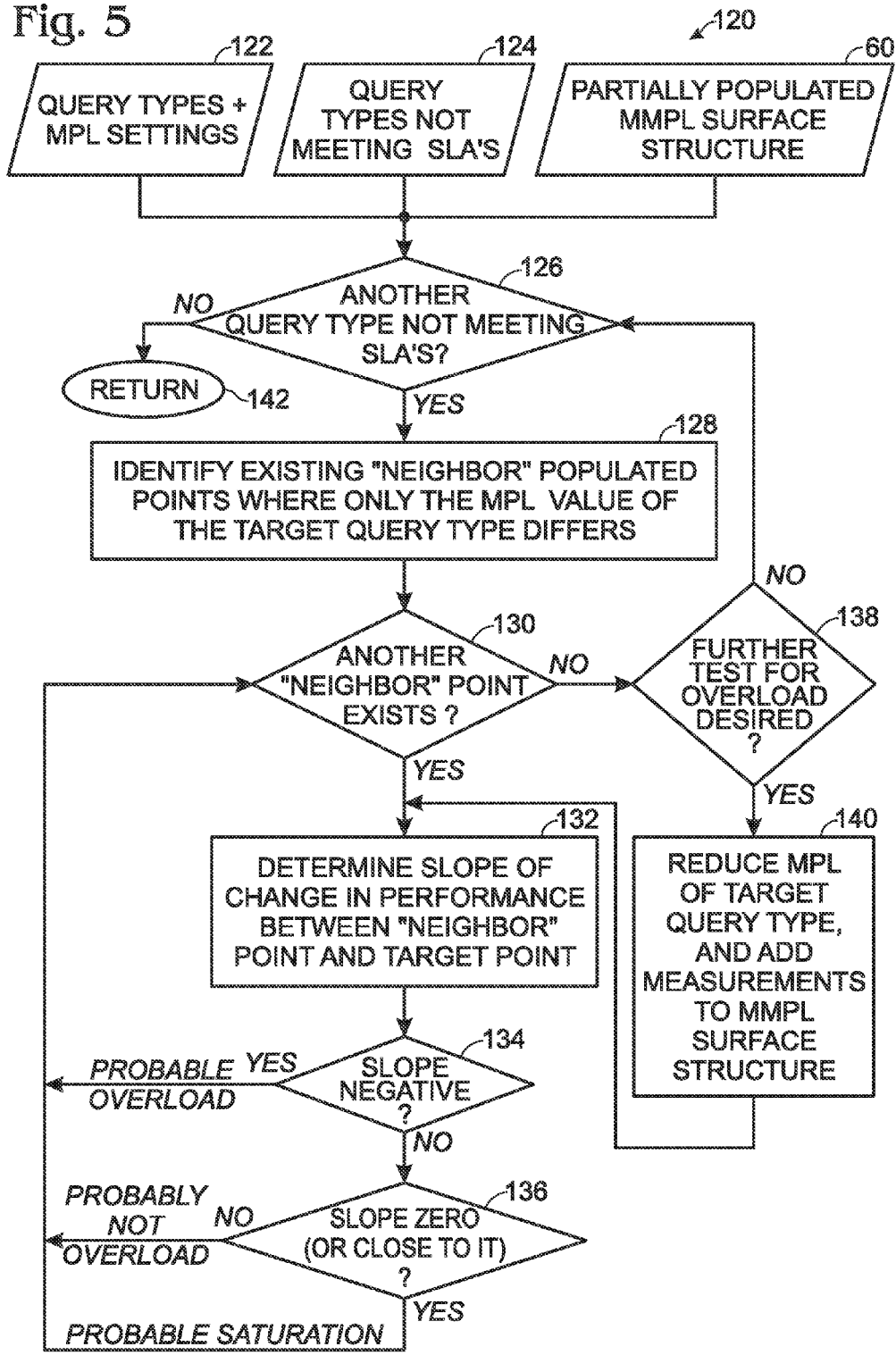

DETERMINING MULTIPROGRAMMING LEVELS

BACKGROUND

A database is a collection of information. A relational database is a database that is perceived by its users as a collection of tables. Each table arranges items and attributes of the items in rows and columns respectively. Each table row corresponds to an item (also referred to as a record or tuple), and each table column corresponds to an attribute of the item (referred to as a field, an attribute type, or field type). To retrieve information from a database, the user of a database system constructs a query. A query contains one or more operations that specify information to retrieve, manipulate, or update from the database. The system scans tables in the database and processes the information retrieved from the tables to execute the query.

Queries of databases represent one form of a transaction that may be performed on a database or other form of computer system. For example, data updates or other data maintenance may also be performed. In complex data processing systems, queries or other transactions may execute in parallel or be programmed to execute concurrently. Additionally, there may be multiple types of transactions that may be executed at a time. A multi-programming level (MPL) is a number of transactions that are scheduled to be executed concurrently. Accordingly, finding a good MPL for each type of transaction may be difficult. If an MPL is too low, then response time and throughput may suffer. If an MPL is too high, then there may be excessive resource contention and response time and throughput may again suffer.

On the one hand, it may be desirable to use system resources efficiently so that service objectives are met (as opposed to missing service objectives despite system resources remaining unused). On the other hand, it may be important to avoid system overload, which occurs when a database system performs inefficiently because too many queries are being processed, or the workload is otherwise too heavy for the data processing system to efficiently process.

As more and more queries are processed on a database system, the number of queries the system processes per minute, as a measure of throughput, may increase at first, as resources become more fully utilized. However, once the database system is overloaded, attempting to process more queries may cause throughput to decrease. This means that the database system completes fewer queries per minute in an overload state than in a non-overload state. It is noted that in an overload state of the database system, not all the resources used by the database system may actually be overloaded. For example, the hard-disk-drive resource of a database system may be overloaded, but queries that do not result in access of this resource may still be added without inordinately impacting the throughput of the database system as a whole, as is the case if queries that result in access of this resource are added. It is also possible in some database systems that the queries that do not result in access of the hard disk drive will still suffer from impaired throughput because they may be forced to wait for other queries that do require access to the hard drive resource.

It also may be difficult to predict how the performance of a given type of query whose behavior is well-known under favorable runtime conditions will degrade under resource contention. The difficulty may be compounded when multiple types of queries run at the same time. Many different types of queries can be run on a data warehouse, ranging from short-running queries used to enable online transactions (OLTP queries), to longer-running queries used to generate reports, and to very long-running transactions used to perform complicated analysis or database maintenance.

BRIEF DESCRIPTION OF THE DRAWINGS

Features and advantages of examples of systems, methods and devices will become apparent by reference to the following detailed description and drawings.

FIG. 1 is a block diagram depicting an example of a computer system in accordance with an embodiment of the invention.

FIG. 2 is a flow chart of an example of a method of managing the execution of transactions in accordance with an embodiment of the invention.

FIG. 3 is an example of a data structure that illustrates performance as a function of MPL for two transaction types in accordance with an embodiment of the invention.

FIG. 5 is a flow chart of an example of a method of determining an overload condition in a complex set of transactions in accordance with an embodiment of the invention.

DETAILED DESCRIPTION

Figure 4A:
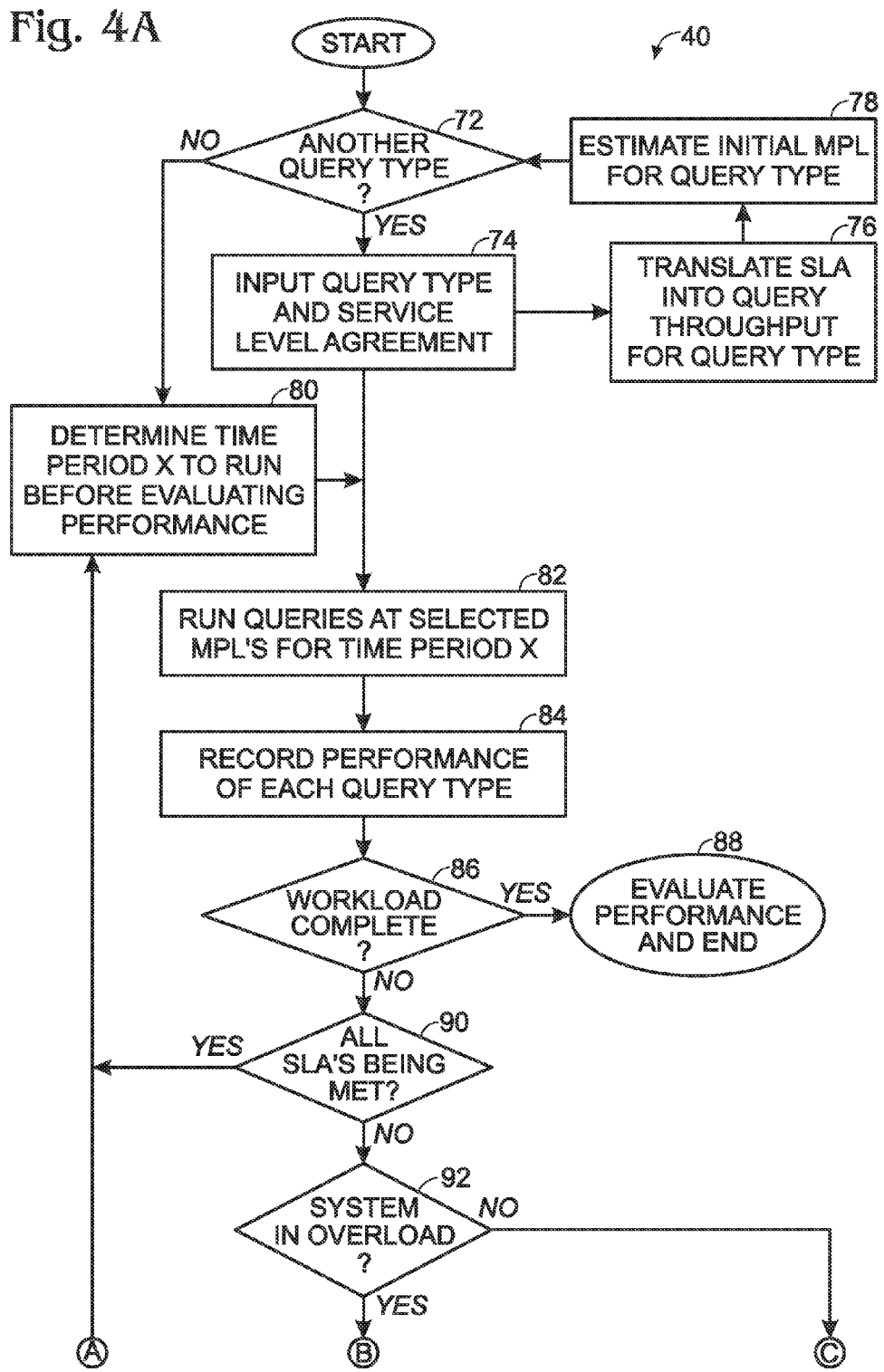
FIGS. 4A and 4B are a flow chart of a further example of a method of managing the execution of transactions in accordance with an embodiment of the invention.

In a computer system, such as a database system or other data processing system, transactions, including operation requests such as database queries, may arrive dynamically. It will be appreciated that although some of the following discussion is directed to queries of databases, the methods and systems described herein may be applied to tasks or jobs in other forms of queue-based systems, such as computer operating systems. There may be a range of values of MPL that may successfully be executed by the computer system. For any given set of operations, referred to as a workload, there may be a relatively small range of values of MPL that will provide close to optimum usage of the computer system. Throughput or completion of the operations is an example of a metric that may be used to gauge the operation of the computer system. A given metric may have a minimum or maximum in a range of acceptable MPLs. As an example, for a set of similar queries that may arrive at a database system dynamically, there may be a small range of values for the MPL that yield optimal or close to optimal response time and throughput. Such a response function may be treated as a unimodal function.

FIG. 1 illustrates an example of a computer system 10 that may perform assigned computer operations on transactions that may dynamically arrive from another source, such as a user's computer system or network. As an example, a set 12 of N types of transactions are shown in a queue prior to being input into the computer system for execution. Computer system 10 may include one or a plurality of associated computer systems. In this example, it is shown as a single computer system.

Computer system 10 may include a first computer subsystem 14 and a second computer subsystem 16. In this example, first computer subsystem 14 may perform the operations from set 12 that may be assigned to it by computer subsystem 16. Each transaction type may have a different computer-system resource requirement. Computer subsystems 14 and 16 may be in communication with each other, either as parts of a single computer system 10, or as parts of separate computer systems. Accordingly, computer subsystems 14 and 16 may each or in combination include intercommunication devices 18, such as local and wide area networks, as well as hardware and software, firmware, or a combination of these. For example, hardware for computer subsystem 14 may include a central processing unit (CPU) or processor 20, a memory storage apparatus 22, as well as input/output connections, chipsets, and other hardware components, not shown.

The memory storage apparatus may be any suitable type of storage device or devices resident in or in association with one or more of the computer systems, and may include non-volatile memory and volatile memory. The non-volatile memory may include data 24, such as a database on which the operations are performed, as well as executable software instructions 26 for execution by the processor, including instructions for an operating system and other applications, such as instructions 28 for processing transactions from transaction set 12.

Similarly, hardware for computer subsystem 16 may include a central processing unit (CPU) or processor 30, as well as a memory storage apparatus 32, and input/output connections, chipsets, and other hardware components, not specifically shown. Processors 20 and 30 may be independent processors, portions of co-processors, or functionally part of a single processor.

Memory storage apparatus 32 may be any suitable type of storage device or devices resident in or in association with computer system 10, and may be part of a shared storage apparatus with the memory storage apparatus serving computer subsystem 14. Storage apparatus thus may include non-volatile memory and volatile memory. The non-volatile memory may include executable software instructions 34 for execution by the processor, including instructions for an operating system and other applications, such as instructions 36 for administration or management of first computer subsystem 14 that may determine an MPL for different transaction types. Memory storage apparatus 32 may also include data 30, such as data used to determine MPLs for the different transaction types and records of MPLs, transaction types, service level agreements, performance measurements, and the like.

An example of a method 40 for managing the execution of a workload of transactions of different transaction types on a computer system, such as computer system 10 or first computer subsystem 14, is illustrated in the flow chart of FIG. 2. Such a method may be implemented on the same computer system or a second computer system or subsystem, such as subsystem 18. The method may begin when a workload 42 of transactions of different types is received from transaction set 12. Workload 42 may be executed in a step 44. A time interval may be established for determining performance during execution. Execution of the workload may continue until such a time interval is completed, as determined at step 46.

When the time interval has passed, the performance of each transaction type may be determined in a step 48. A determination may then be made in step 50 as to whether a transaction type is overloaded. A transaction type may be considered to be in an overloaded state when performance is degraded with an increase in the number of transactions of the transaction type. The performance degradation may be for the same transaction type or it may be for a different transaction type. If not, execution continues until the next time interval is completed. The time intervals may be regular, i.e., periodic, or they may be for irregular periods of time. For example, the interval may be recomputed after the performance of the system has been determined.

If there is an overloaded transaction type, the number of transactions in at least one transaction type may be changed in step 52. Processing then returns to step 46 and execution of the workload continues in step 44 until the next time interval is completed.

FIG. 3 illustrates a normalized three-dimensional representation of a data structure 60 indicating performance for two query (transaction) types, Type A and Type B. Data for all N transaction types may be generated by computer subsystem 16. The possible MPL levels for each of the data types is represented along a respective axis, such as axis 62 for query Type A and axis 64 for query Type B. In this example, query Type A has n possible MPLs and query Type B has m possible MPLs. This structure is in effect a "Multiple MPL Surface" structure, referred to as an MMPL Surface structure for short.

A grid 66 represents a collection of data points, shown as cells 68, for which the performance of each query type may be represented (recorded) for the associated combination of MPLs of each query type. Thus, a cell $C_{kj}$ may include a normalized performance value $TA_{kj}$ for query Type A at $MPL_A=k$ and a normalized performance value $TB_{kj}$ for query Type B at $MPL_B=j$. Any of the cells 68 may be populated with the performance data, but there may be extensive overhead in populating the entire grid.

Data structure 60 may provide a normalized representation of throughput with a single measure of system performance at various MPLs applicable to a heterogeneous set of transactions. The data structure thus may be used to map out the space of possible workloads. Performance may be measured at different points so as to create conceptually a surface that indicates performance under various conditions. Such a populated data structure may be used to inform workload management decisions such as admission control, scheduling, and execution control.

Figure 4B:
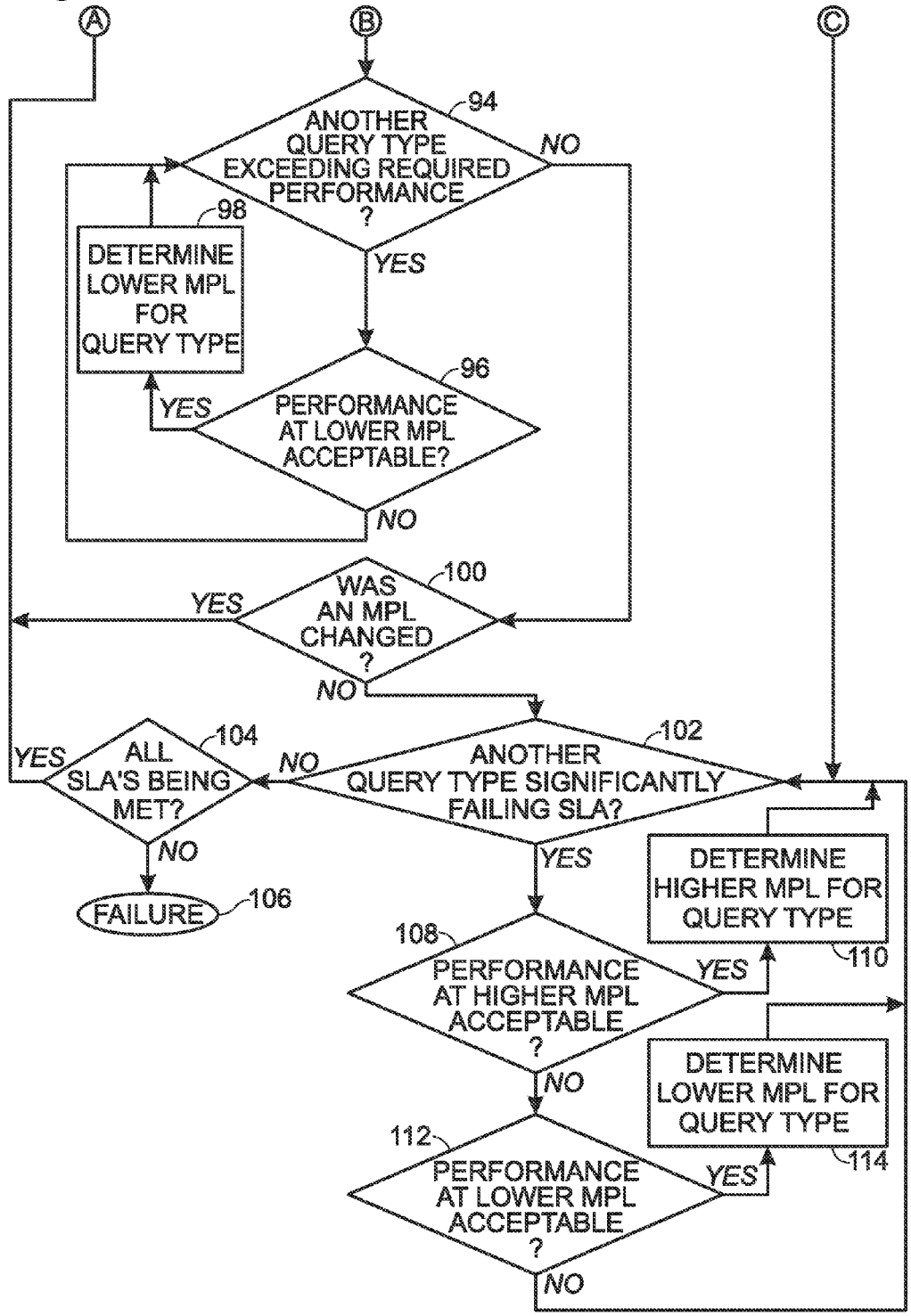

FIGS. 4A and 4B comprise a flow chart of an exemplary method 70 for managing the workload for a computer subsystem 14. For each query type, as determined in a step 72, the query type and associated service level agreement (SLA) may be received in a step 74. The SLA may then be translated into a performance measure in a step 76. This may provide a uniform way of evaluating whether or not performance improves when MPL is raised or lowered. Performance at various MPLs may be compared using a query-specific measure such as query throughput—the number of queries completed over time. Performance characteristics may be compared for different transaction types, or more specifically in this example, for different query types. Other examples of measures that may be used include the number of rows processed by all queries of a given type over time, the monetary value of work done over time, or the aggregate resource usage over time (e.g., number of CPU seconds across all processors over time).

An initial MPL for the given query type may then be determined in a step 78. This may be a value that may be input by a subsystem administrator, such as a database administrator, based for example on prior known values or an estimate of reasonable values. It may also be computed automatically by the use of system models of operation estimators. A query optimizer may provide estimates for each query type plus workload arrival rate estimates. For example, if two report queries are expected to be received per minute, and have a minimum-response-time threshold of 45 seconds per query, then the search may be started with an initial MPL of 2 for that query type. In other words, if the number of queries is known that may be needed to complete of a given query type per time period in order to meet service level agreements, an initial MPL value may be set accordingly.

Although not represented in FIGS. 4A and 4B, a combined utility function for all queries in the current workload may be produced. In order to create a single measure of system performance at various multi-programming levels that can be applied to a heterogeneous set of queries, a normalized representation may accommodate the consideration of the value of work done under various MPLs. The combination of such measures, such as by weighting them to reflect the service level agreements and then adding them together, may provide a measure of the overall work performed by the entire system. For example, CPU seconds used by queries of one type may be twice as "valuable" as CPU seconds used by queries of a second type.

For example, if a service level agreement calls for a given response time threshold for a certain query type, and the normalized value measure happens to be a number of rows processed per minute, then the number of queries that are completed per minute to meet that minimum threshold may be determined. That number may then be multiplied by the average number of rows processed in the process of completing each query of that type. Otherwise, the measures for each query type may be kept separate.

A time period X may be determined at step 80 during which the workload may be run. The length of time needed for this measurement period may for example depend on the time needed to run the most expensive queries. It may be based on the operating conditions of the system. For example, a progress indicator may be used to evaluate the progress of very long-running queries. Measurement may be stopped when the time period has elapsed or when either it may be clear that at least one service level agreement (SLA) is likely to be violated under these conditions or when it may be clear that all SLAs are likely to be met. As has been mentioned, the intervals may be regular or irregular.

This step may be the beginning of a feedback loop used to locate a point at which service level agreements are met. During step 82 the queries may be run at the selected MPLs for the current time period X. Performance may be measured during running of the queries. At the completion of time period X, the performance of each query type may be recorded in a step 84. The performance levels may be recorded in a data structure 60 having one dimension for each query type's MPL and a single dimension that represents the value of work done for each combination of query-type MPLs.

A different example of this structure may include normalized MPL dimensions. For example, instead of MPL, a measure such as multiplying MPL by the average amount of memory used by a single query of the given query type may be used. Multiplying MPL by the average number of rows processed by a given query of that type is another measure that may be used.

A unified utility function may facilitate the comparison of the costs and benefits of allocating system resources to one query type versus another. The MMPL Surface structure 60 may be used to map out the space of possible workloads. However, this space may potentially be quite large, and the effort needed to measure even a single point in this space can be quite expensive. Furthermore, it may be that because machine-time may be expensive or because workloads are dynamic, this surface may be populated at runtime (on the fly), and avoid spending long periods of time running experiments to populate the map ahead of time.

It may be appropriate to only populate meaningful portions of the MMPL Surface structure. One may use the structure to find an optimal point, the point that maximizes the value of work done. On a uni-modal MPL curve, this point would be the maximum. The MMPL Surface structure also may be useful for one or more of the following purposes, and the MMPL Surface may be incrementally populated in the course of the associated searches:

1) Locate at least one point at which service level agreements are met or indicate that it may not be possible to meet all service level agreements while running multiple query types simultaneously.

2) Identify whether or not a given point may be in a state of system overload.

3) Locate the boundaries at which the system may be overloaded.

The MMPL Surface structure may be selectively populated enough to determine the desired information. Each time performance may be measured, it may be recorded in the MMPL Surface structure. In the following discussion for this example, an axial cross section of an MMPL Surface structure may be assumed to be unimodal although it is possible that for some workloads an axial cross section would not be unimodal.

A determination may be made at step 86 as to whether the workload has been completed. If it has, the system performance may be evaluated and the process terminated at a step 88. If the workload has not been completed, then a determination may be made in step 90 as to whether the service level agreements for the different query types are being met.

If all service level agreements are being met and the system may not be likely to be in a state of overload with respect to any given query type, then the process may return to step 80. Otherwise, it may be desirable to continue an analysis of the system so as to refine MPL settings to further improve performance. After satisfactory MPLs have been determined, the system performance may be monitored intermittently to ensure SLAs continue to be met by repeating steps 82, 84, 86 and 90.

If not all SLAs are being met, as determined in step 90, then a determination may be made in a step 92 as to whether the system may be in overload. An overload condition may be identified by a suitable method, such as the method illustrated in the flowchart of FIG. 5. Step 92 may then initiate a process for refining the MPLs for the various query types. If the system may be in overload, then an iteration begins through the query types, lowering the MPL of query types that are exceeding their objectives and raising (if MPL may be too low) or lowering (if MPL may be too high) the MPL of query types that are not meeting their objectives. In particular, a determination may be made in a step 94 as to whether there may be a query type exceeding the required performance, i.e., the SLAs. A query type may be considered, for example, if it may be performing significantly over its minimum threshold, where "significantly" may be measured relative to the average costs of running queries of that type.

If there is, then a determination may be made in a step 96 as to whether performance at a lower MPL would be acceptable. Query costs and the degree to which performance exceeds or falls below a minimal threshold may be taken into consideration in determining whether a lower MPL would be acceptable. For example, if a given query type describes very expensive reporting queries, and may be performing significantly better than the last tested MPL but just slightly better than its service level agreements, then it may not be appropriate to lower its MPL. If, however, performance may be an order of magnitude better than required by service level of agreements and queries are very short-running, then the MPL may be lowered significantly. If a lower MPL may not be acceptable, the process may return to step 94 to determine if there may be another query type exceeding the required performance.

If performance at a lower MPL may be determined to be acceptable in step 96, then a lower MPL level may be determined for the query type. A process for determining whether a lower MPL would be acceptable may be made in step 98 by comparing a neighboring point on the MMPL Surface structure 60 for a lower MPL for the given query type. For example, if the existing workload includes an $MPL_A=3$ and an $MPL_B=j$, and $MPL_A$ is the MPL exceeding the associated SLA, then the performance for $MPL_A=2$ and $MPL_B=j$ may be determined. In the example shown, the performance of query Type A drops from 600 to 500. If this may be acceptable, then the $MPL_A$ may be set to 2 in step 98. If it may be not acceptable, then processing may be returned to step 94 to determine whether a different query type that exceeds performance may be assigned a lower MPL. Other techniques may also be used to refine the various MPL settings, such as queuing models or simulation.

It will be seen that multiple query types may be assigned lower MPLs at step 98. After all query types have been evaluated in step 94 and no query type may be performing significantly over its minimum threshold, processing may continue to step 100 during which a determination may be made as to whether any MPLs were lowered in step 98. If so, processing may return to step 80 and the procedure may be repeated after a time period X. The new performance measurements may indicate whether the system may still be overloaded or whether performance has improved or deteriorated.

If all service level agreements are being met and the system may be not likely to be in a state of overload with respect to any given query type, then performance may continue to be monitored. Otherwise, it may be desirable to continue to refine MPL settings to further improve performance. That is, if the process reaches step 100, all SLAs are not being met, the system may be overloaded, and there are no query types that are sufficiently exceeding required performance levels, then a determination may be made in step 102 as to whether any query types are significantly failing the SLAs.

If no query types are significantly failing the SLAs, then a determination may be made again in step 104 as to whether all SLAs are being met. This may be the case where all service level agreements are being met and the system may not be likely to be in a state of overload with respect to any given query type. If so, then processing returns to step 80 and performance may be monitored. If not, then a system failure may be considered to exist, since the current configuration likely does not permit meeting all service level agreements. The user may be notified at a step 106. A determination may then be made as to whether eliminating one or more query types from the workload will enable a solution to be found.

Step 102 may also be performed if the system may be determined in step 92 to not be overloaded. If in step 102 it may be determined that a query type may be significantly failing the associated SLA, as may be the case for an overloaded query type, then a determination may be made in a step 108 as to whether performance at a higher MPL would be acceptable for that query type. A process for determining whether a higher MPL would be acceptable may be made in step 108 by comparing a neighboring point on the MMPL Surface structure 60 for a higher MPL for the given query type. For example, if the existing workload includes an $MPL_A=2$ and an $MPL_B=j$, and query Type A is the query type that has a significantly failing SLA, then the performance for $MPL_A=3$ and $MPL_B=j$ may be determined. In the example shown, the performance of query Type A increases from 500 to 600. If this is acceptable, then the $MPL_A$ may be set to 3 in step 110. As with lowering MPL, the amount that MPL may be raised may be proportional to query costs and the degree to which performance exceeds or falls below the minimal threshold. A search algorithm may also be used to find an MPL that provides a preferred level of performance. For example, a search to find an MPL level close to a maximum where performance is a unimodal function of MPL is disclosed in a co-pending U.S. patent application Publication No. 2011/0283294, entitled "Determining Multi-Programming Level Using Diminishing-Interval Search," filed May 11, 2010.

Another query type may then be evaluated in step 102 and the process repeated until all of the query types have been considered. This process may continue to raise the MPL of query types that are still performing under the minimum SLA threshold until no query type is performing under its minimum SLA threshold or the system may be in a state of overload.

If it is determined in step 108 that performance at a higher MPL may be not acceptable, then a determination may be made in step 112 as to whether performance at a lower MPL may be acceptable. If so, a lower MPL may be determined in step 114 for that query type. Another query type may then be evaluated in step 102 and the process repeated until all of the query types have been considered. If performance at a lower MPL may not be acceptable, then processing returns to step 102.

It will be appreciated that this process may provide that if the system may likely be in a state of overload with respect to a given query type, then the MPL of that query type may be reduced, unless previously measured points advise against it. For example, if the immediate neighbor on the MMPL Surface structure may not be in a state of overload, but also does not meet the service level agreement, then that query type's MPL may not be reduced at this point.

FIG. 5 illustrates an exemplary method 120 of determining whether an overload exists. Such a method may be used in step 92 of method 40. A current workload may be considered a location on the MMPL Surface structure 60. A determination may be made using method 120 as to whether any of the query types are set to an MPL that results in that query type or another query type being in a state of overload. An MPL for a query type may be considered to be in a state of near overload or saturation if reducing the MPL for that query type would not diminish that query's normalized performance. An MPL for a query type may be considered to be in a state of overload if reducing the MPL for that query type would improve that query's normalized performance or the normalized performance of another query type. This may be a simple test if the MPL for one query type is changed at a time, but may be more difficult if the MPLs for multiple query types are changed at a time.

The partially populated MMPL Surface structure may be used to identify likely states of system overload and system near-overload by plotting, as needed, selected points on the surface for the point in question along the plane that runs parallel to the axis defined by that query type's MPL. The slope of lines, indicating degree and character of change, extending between the target point and its neighbors may be considered in determining the state of the associated query type. The slope may be positive, negative, or near zero, and also may have a steepness indicating the rate of change. The steepness may be determined, for example by taking the second derivative of a line between the points.

Method 120 may begin with the query types and associated MPL settings, represented by box 122, a list of query types not meeting service-level agreements, represented by box 124, and the partially populated MMPL Surface structure 60. The query types not meeting SLAs may be iteratively selected for evaluation at a step 126, which determines whether there is an unevaluated query type not meeting SLAs.

For each query type identified in step 126, any "neighbor" points that already exist on the MMPL Surface structure may be identified in step 128. These "neighbor" points may be points where only the MPL value of the target query type differs. That is, the MPL values of the other query types remain the same between the current point and the "neighbor" point. The "neighbor" points may then be iteratively selected at step 130. For each "neighbor" point selected, a determination may then be made at step 132 as to the slope between the "neighbor" point and the target point.

If the slope is negative, as determined at step 134 then the location may likely be in a state of overload with respect to the query type. Processing then may return to step 130 for evaluation of another "neighbor" point, if appropriate. If the slope is not negative, and is not zero or sufficiently close to zero, as determined at step 136, then the slope may be positive. A positive slope may be an indication that the target query type is probably not overloaded. If the slope is equal to or close to zero, then the target query type may be saturated. In either case, once the slope is determined, processing then may return to step 130.

If it is determined in step 130 that a suitable "neighbor" point on the MMPL Surface structure does not exist, then it may be determined in step 138 whether a further test for overload is desired. The suitableness of a "neighbor" may depend on how near the neighbor is, where "nearness" may be defined with respect to the size of the target query type. If there are no near "neighbors" and performance does not meet the minimal threshold for the query type, then processing may proceed to step 140. In step 140, the MPL of the target query type may be reduced. The MPL of all other query types may be held fixed. New measurements may then be taken at the new point and the measurements may be added to the MMPL Surface structure. A determination may then be made in step 132 of the slope of the new "neighbor" point relative to the target point, and the slope may be evaluated in steps 134 and 136, as has been described.

If it is determined in step 138 that no further test for overload is desired, then processing may return to step 126. If there are no further query types not meeting SLAs that have not been evaluated, then in step 142 processing may return to step 92 of method 40, with the determination from method 120 as to whether the system may be in overload.

In addition to scheduling a mixed workload, the partially populated MMPL Surface data structure may be used to facilitate other workload management decisions. For example, a partially populated MMPL Surface structure may be used to identify when two query types contend with each other to such a degree that workload completion is in jeopardy. By appropriately populating the MMPL Surface structure, it may become apparent for example that eliminating one or more query types from the workload may allow the remaining workload to complete.

As a further example, a partially populated MMPL Surface structure may be used to determine which queries are less likely to contend with each other prior to scheduling the queries in a workload. It may also help in determining how many queries are likely to be able to complete, so queries that can't complete may not be admitted. A partially populated MMPL Surface structure may also be used to help determine when a workload is likely to result in a state of overload, thereby allowing for the termination of the likely offender, and thus prevent the overload situation.

It will be appreciated, then that the foregoing methods and systems may be used to find different MPL settings for different types of queries in a mixed workload automatically without the intervention of a human operator to set them. Measurements may be limited to points for which information is useful, without requiring all possible combinations of query types to be identified and the impact of their contention on performance to be tested before or even during run-time. The evaluations may be performed without knowledge about or a model of the system hardware or software. The same algorithm may work for a system that uses an MPL setting to control scheduling of work.

The values of the MPLs also may be set dynamically as the mix of work or resource availability changes. A given query type may require a higher MPL value or a lower MPL value under different conditions. Appropriate MPL settings may be found automatically when system management tasks such as system backup contend with the query workload. One or more utility functions also may be developed to provide a combined score of the benefit of a particular configuration of MPL settings, allowing for general evaluation of workloads.

We claim:

1. A method comprising:
   receiving, at a computer system, a workload of transactions of different transaction types to be executed concurrently by the computer system, wherein each transaction type is associated with a different resource requirement of the computer system;
   providing a data structure having a plurality of dimensions representing respective levels for the corresponding different transaction types, wherein each of the levels represents a number of transactions of the corresponding transaction type, and wherein the data structure stores measured performance data for the different transaction types; and
   intermittently during execution of the workload,
      determining a performance of each transaction type;
      determining, based on accessing content of the data structure, if there is an overloaded transaction type indicated by degradation of execution throughput of the workload of transactions with an increase in a number of transactions of the overloaded transaction type, wherein determining if there is the overloaded transaction type comprises determining the performance of each transaction type when a number of transactions of at least one given transaction type in the workload is changed, and a character of the change in the performance of the at least one given transaction type when the number of transactions of the at least one given transaction type in the workload is changed, and
      in response to determining presence of the overloaded transaction type, changing a number of transactions of at least one transaction type.

2. The method of claim 1, wherein determining if there is the overloaded transaction type includes determining if there is the overloaded transaction type in which performance of a transaction type other than the overloaded transaction type is degraded with an increase in the number of transactions of the overloaded transaction type.

3. The method of claim 1, wherein changing the number of transactions includes reducing the number of transactions of at least one transaction type that is not in an overload condition.

4. The method of claim 1, wherein the data structure includes entries each storing measured performance data for the different transaction types, and wherein each of the entries corresponds to a specific respective combination of the levels for the corresponding different transaction types.

5. A method comprising:
receiving, at a computer system, a workload of transactions of different transaction types to be executed concurrently by the computer system, wherein each transaction type is associated with a different resource requirement of the computer system;
providing a data structure having a plurality of dimensions representing respective levels for the corresponding different transaction types, wherein each of the levels represents a number of transactions of the corresponding transaction type, and wherein the data structure stores performance data for the different transaction types; and
intermittently during execution of the workload,
determining a performance of each transaction type;
determining, based on accessing content of the data structure, if there is an overloaded transaction type indicated by degradation of execution throughput of the workload of transactions with an increase in a number of transactions of the overloaded transaction type, and
in response to determining presence of the overloaded transaction type, changing a number of transactions of at least one transaction type; and
receiving a service level indicator for each transaction type, and translating the service level indicator into a respective transaction-throughput goal, and wherein determining the performance of each transaction type includes determining the performance of each transaction type based on the respective transaction-throughput goal.

6. A computer system, comprising:
a storage apparatus for storing processor-readable instructions and a data structure having a plurality of dimensions representing respective levels for corresponding different transaction types, wherein each of the levels represents a number of transactions of the corresponding transaction type, and wherein the data structure stores performance data for the different transaction types; and
at least one processor to execute the processor-readable instructions to:
receive a workload of transactions of the different transaction types to be executed concurrently by the computer system, wherein each transaction type is associated with a different resource requirement of the computer system; and
intermittently during execution of the workload,
determine a performance of each transaction type,
determine, based on accessing content of the data structure, if there is an overloaded transaction type indicated by degradation of execution throughput of the workload of transactions with an increase in a number of transactions of the overloaded transaction type, wherein determining if there is the overloaded transaction type includes determining, based on the content of the data structure:
the performance of each transaction type when a number of transactions of at least one given transaction type in the workload is changed, and
a character of the change in the performance of the at least one given transaction type when the number of transactions of the at least one given transaction type in the workload is changed, and
in response to determining presence of the overloaded transaction type, change a number of transactions of at least one transaction type.

7. The computer system of claim 6, wherein the at least one processor is further for executing the processor-readable instructions for determining if there is the overloaded transaction type in which performance of the overloaded transaction type is degraded with an increase in the number of transactions of the overloaded transaction type.

8. The computer system of claim 6, wherein the at least one processor is further for executing the processor-readable instructions for determining if there is the overloaded transaction type in which performance of the transaction type other than the overloaded transaction type is degraded with an increase in the number of transactions of the overloaded transaction type.

9. The computer system of claim 6, wherein the at least one processor is further for executing the processor-readable instructions for receiving a service level indicator for each transaction type, translating the service level indicator into a respective transaction-throughput goal, and determining the performance of each transaction type based on the respective transaction-throughput goal.

10. The computer system of claim 6, wherein the at least one processor is further for executing the processor-readable instructions for executing the workload of a respective given number of transactions of each transaction type, and determining, based on the content of the data structure, the performance of each transaction type when the given number of transactions of the overloaded transaction type is changed.

11. The computer system of claim 6, wherein the data structure includes entries each storing measured performance data for the different transaction types, and wherein each of the entries corresponds to a specific respective combination of the levels for the corresponding different transaction types.

12. A non-transitory computer-readable storage medium storing instructions, that when executed by a computer system, cause the computer system to:
receive a workload of transactions of different transaction types to be executed concurrently by the computer system, wherein each transaction type is associated with a different resource requirement of the computer system;
provide a data structure having a plurality of dimensions representing respective levels for the corresponding different transaction types, wherein each of the levels represents a number of transactions of the corresponding transaction type, and wherein the data structure stores measured performance data for the different transaction types; and
intermittently during execution of the workload,
determine, based on accessing content of the data structure, a performance of each transaction type;
determine if there is an overloaded transaction type indicated by degradation of execution throughput of the workload of transactions with an increase in a number of transactions of the overloaded transaction type, and
in response to determining presence of the overloaded transaction type, change a number of transactions of at least one transaction type;
receive a service level indicator for each transaction type, translate the service level indicator into a respective transaction-throughput goal, and determine the performance of each transaction type based on the respective transaction-throughput goal.

13. The computer-readable storage medium of claim 12, wherein determining if there is an overloaded transaction type includes determining if there is the overloaded transaction type in which performance of the overloaded transaction type is degraded with an increase in the number of transactions of the overloaded transaction type.

14. The computer-readable storage medium of claim 12, wherein determining if there is the overloaded transaction type includes determining if there is the overloaded transaction type in which performance of a transaction type other than the overloaded transaction type is degraded with an increase in the number of transactions of the overloaded transaction type.

15. The computer-readable storage medium of claim 12, wherein the instructions when executed cause the computer system to further execute the workload of a respective given number of transactions of each transaction type, and determine, based on the content of the data structure, the performance of each transaction type when the given number of transactions of the overloaded transaction type is changed.

16. The computer-readable storage medium of claim 12, wherein the data structure includes entries each storing measured performance data for the different transaction types, and wherein each of the entries corresponds to a specific respective combination of the levels for the corresponding different transaction types.

* * * * *